(12) United States Patent
Xu et al.

(10) Patent No.: US 10,979,703 B2
(45) Date of Patent: Apr. 13, 2021

(54) ADAPTIVE FILTERING FOR SCALABLE VIDEO CODING

(75) Inventors: Lidong Xu, Beijing (CN); Wenhao Zhang, Beijing (CN); Yi-Jen Chiu, San Jose, CA (US); Hong Jiang, El Dorado Hills, CA (US); Yu Han, Beijing (CN)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 13/991,606

(22) PCT Filed: Jun. 15, 2012

(86) PCT No.: PCT/CN2012/076960
§ 371 (c)(1),
(2), (4) Date: Jun. 4, 2013

(87) PCT Pub. No.: WO2013/185336
PCT Pub. Date: Dec. 19, 2013

(65) Prior Publication Data
US 2014/0219333 A1    Aug. 7, 2014

(51) Int. Cl.
*H04N 19/66* (2014.01)
*H04N 19/105* (2014.01)
(Continued)

(52) U.S. Cl.
CPC ......... *H04N 19/105* (2014.11); *H04N 19/117* (2014.11); *H04N 19/136* (2014.11);
(Continued)

(58) Field of Classification Search
CPC .. H04N 7/50; H04N 7/26888; H04N 7/26244; H04N 7/26335; H04N 7/26941; H04N 19/105; H04N 19/187; H04N 19/117; H04N 19/136; H04N 19/172; H04N 19/176; H04N 19/182; H04N 19/154; H04N 19/463; H04N 19/33
See application file for complete search history.

(56) References Cited

U.S. PATENT DOCUMENTS 5,844,627 A * 12/1998 May .................. H04N 5/21
348/607
7,962,736 B1 * 6/2011 Polyudov ............ G06F 8/65
710/48
(Continued)

FOREIGN PATENT DOCUMENTS

CN     101557522       10/2009
CN     101557522 A     10/2009
(Continued)

OTHER PUBLICATIONS

PCT International Search Report and Written Opinion issued in corresponding PCT/CN2012/076960 dated Mar. 21, 2013, (10 pages).
(Continued)

*Primary Examiner* — Shawn S An
(74) *Attorney, Agent, or Firm* — Trop, Pruner & Hu, P.C.

(57) ABSTRACT

In a scalable video codec, an adaptive Wiener filter with offset aims to minimize the differences between two input pictures or picture regions, and the filter coefficients need to be transmitted to decoder site.

31 Claims, 4 Drawing Sheets

(51) Int. Cl.
  *H04N 19/187* (2014.01)
  *H04N 19/117* (2014.01)
  *H04N 19/136* (2014.01)
  *H04N 19/172* (2014.01)
  *H04N 19/176* (2014.01)
  *H04N 19/182* (2014.01)
  *H04N 19/154* (2014.01)
  *H04N 19/463* (2014.01)
  *H04N 19/33* (2014.01)

(52) U.S. Cl.
  CPC ......... *H04N 19/154* (2014.11); *H04N 19/172* (2014.11); *H04N 19/176* (2014.11); *H04N 19/182* (2014.11); *H04N 19/187* (2014.11); *H04N 19/33* (2014.11); *H04N 19/463* (2014.11)

(56) References Cited

U.S. PATENT DOCUMENTS

| | | | | |
|---|---|---|---|---|
| 2007/0014349 A1* | 1/2007 | Bao | | H04N 19/139 375/240.1 |
| 2007/0025448 A1* | 2/2007 | Cha | | H04N 19/159 375/240.24 |
| 2008/0095238 A1* | 4/2008 | Wu | | H04N 19/51 375/240.16 |
| 2009/0257486 A1* | 10/2009 | Chiu | | H04N 19/117 375/240.02 |
| 2010/0142844 A1* | 6/2010 | Pereira | | G06T 5/002 382/261 |
| 2010/0254463 A1* | 10/2010 | Narroschke | | H04N 19/147 375/240.29 |
| 2012/0093426 A1* | 4/2012 | Sato | | G06T 9/004 382/233 |
| 2012/0177107 A1* | 7/2012 | Fu | | H04N 19/61 375/240.03 |
| 2012/0269261 A1* | 10/2012 | Choi | | H04N 19/176 375/240.02 |
| 2012/0307898 A1* | 12/2012 | Chono | | H04N 19/61 375/240.13 |
| 2013/0136371 A1* | 5/2013 | Ikai | | G06T 5/001 382/224 |
| 2015/0103900 A1* | 4/2015 | Liu | | H04N 19/31 375/240.12 |

FOREIGN PATENT DOCUMENTS

| | | |
|---|---|---|
| CN | 101662682 A | 3/2010 |
| CN | 102333230 | 1/2012 |
| JP | 2009512347 A | 3/2009 |
| JP | 2010507937 A | 3/2010 |
| WO | 2011039931 A1 | 4/2011 |
| WO | 2011064945 | 6/2011 |
| WO | 2011064945 A1 | 6/2011 |

OTHER PUBLICATIONS

CN office action in corresponding CN application No. 201280073158.0 dated Dec. 5, 2016 (6 pages). [no translation].
JP office action in corresponding JP application No. 2015-510605 dated Oct. 27, 2015 (10 pages).
JP office action in corresponding JP application No. 2015-510605 dated Apr. 5, 2016 (6 pages).
CN office action in corresponding CN application No. 201280073158.0 dated Jul. 31, 2017 (5 pages). [no English translation].
CN office action in corresponding CN application No. 201280073158.0 dated Jul. 31, 2017 (12 pages).
CN third office action in corresponding CN application No. 201280073158.0 dated Jan. 23, 2018 (5 pages) [no English translation].
CN third office action in corresponding CN application No. 201280073158.0 dated Jun. 5, 2018 (4 pages) [no English translation].
CN office action (Notice of Reexamination) in corresponding CN application No. 201280073158.0 dated Dec. 10, 2018 (10 pages).
CN office action (Reexamination Decision) in corresponding CN application No. 201280073158.0 dated Mar. 19, 2019 (10 pages).

* cited by examiner

ADAPTIVE FILTERING FOR SCALABLE VIDEO CODING

BACKGROUND

This relates generally to scalable video codecs. The scalable video codec may be bit-depth scalable video codec, spatial scalable video codec, temporal scalable video codec, color space scalable video codec, color format scalable video codec, and etc.

Scalable video codecs enable different picture quality levels to be delivered to different customers, depending on what type of service they prefer. Lower quality video services may be less expensive than higher quality video services.

In a bit-depth scalable video coder, a lower bit depth may be called a baseline layer and a higher bit depth may be called an enhancement layer. The greater the bit depth, the better the quality of the video. In a spatial scalable video coder, a lower picture resolution may be called a baseline layer and a higher picture resolution may be called an enhancement layer. The larger the picture resolution, the better the quality of the video. Other scalabilities include spatial scalability, temporal scalability, signal-to-noise ratio (SNR) scalability, color format scalability, color gamut or color space scalability.

In a scalable video codec, an encoder and decoder may be provided as one unit. In some cases, only an encoder may be provided and, in other cases, only a decoder may be provided. The scalable video coder enables the system to operate with at least the baseline layer. Thus, in low cost systems, only the baseline layer may be utilized and, in higher cost, more advanced systems, one or more enhancement layers may be utilized.

It is advantageous to derive the enhancement layer from the baseline layer. To this end, inverse tone mapping may be utilized in bit-depth scalable video coding to increase the bit depth of the baseline layer to the bit depth of the enhancement layer. In some cases, for example, the baseline layer may be 8 bits per pixel and the enhancement may be 10, 12, or higher bits per pixel.

BRIEF DESCRIPTION OF THE DRAWINGS

Some embodiments are described with respect to the following figures.

DETAILED DESCRIPTION

Figure 1:
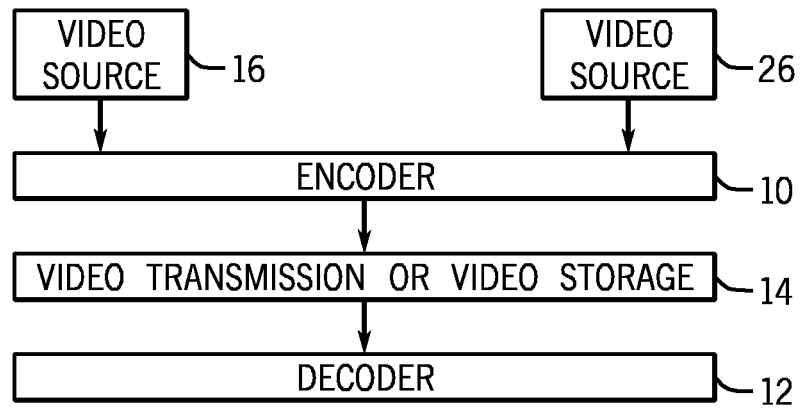
FIG. 1 is a schematic depiction of an encoder and decoder system in accordance with one embodiment of the present invention.

Referring to FIG. 1, a scalable video codec includes an encoder 10 that communicates over a video transmission or a video storage 14 with a decoder 12. FIG. 1 shows an encoder from one codec with a decoder from another codec.

As an example, a network computer may communicate over the network with another computer. Each computer may have a codec which includes both an encoder and a decoder so that information may be encoded at one node, transmitted over the network to the other node, which then decodes the encoded information.

The codec shown in FIG. 1 is a scalable video codec (SVC). This means that it is capable of encoding and/or decoding information with different qualities, e.g., different bit depths, different picture sizes and etc. Video sources 16 and 26 may be connected to the encoder 10. For bit-depth scalability, the video source 16 may use N-bit video data, while the video source 26 may provide M-bit video data, where the bit depth M is greater than the bit depth N. For spatial scalability, the video source 16 may use smaller picture size video data, while the video source 26 may provide bigger picture size video data. In other embodiments, more than two sources with more than two bit depths or two picture sizes may be provided.

In each case, the information from a video source is provided to an encoder. In the case of the video source 16, of lower bit depth, the information is provided to a baseline encoder 18. In the case of the video source 26, of higher bit depth, an enhancement layer encoder 28 is utilized.

The baseline encoder of FIG. 1 may be consistent with the H.264 (advanced video codec (AVC) and MPEG-4 Part 10) or HEVC (high efficient video codec), compression standard, for example. The H.264 standard has been prepared by the Joint Video Team (JVT), which includes ITU-T SG16 Q.6, also known as VCEG (Video Coding Expert Group), and of the ISO-IEC JTC1/SC29/WG11 (2003), known as MPEG (Motion Picture Expert Group). The HEVC standard is been preparing by the Joint Collaborative Team on Video Coding (JCTVC), which also includes VCEG and MPEG, and will be finalized by January 2013. H.264 and HEVC are designed for applications in the area of digital TV broadcast, direct broadcast satellite video, digital subscriber line video, interactive storage media, multimedia messaging, digital terrestrial TV broadcast, and remote video surveillance, to mention a few examples.

While one embodiment may be consistent with HEVC video coding, the present invention is not so limited. Instead, embodiments may be used in a variety of video compression systems including H.264/AVC, MPEG-2 (ISO/IEC13818-1 (2000) MPEG-2 available from International Organization for Standardization, Geneva, Switzerland) and VC1 (SMPTE 421 M (2006) available from SMPTE White Plains, N.Y. 10601).

Adaptive filtering may be achieved by a Wiener filter in one embodiment. A Wiener filter is a filter that achieves the least mean square error among the source signal and the predicted signal modeled through the random noise. "Adaptive filtering" means that filtering is content dependent or based on an analysis of pixel intensities in a portion of a picture, a picture as a whole, or a plurality of successive pictures. For example, the type of video information that is received, be it graphics or stream view video, results in different taps in the Wiener filter for different types of video. Thus, adaptive filter taps are the result of an examination of the intensity of each pixel in a given picture portion, picture, or series of pictures.

The encoder provides information over the video transmission or video storage 14 for use by a decoder. The information that may be provided may include the baseline (BL) layer video stream, the lower layer picture process information (e.g., inverse tone mapping (ITM) information for bit-depth scalability or picture up-scale information for spatial scalability), the filter taps from the adaptive filtering 24, and the enhancement layer (EL) video stream. Some of this information may be included in a packet header. For example, the inverse tone mapping (ITM) or picture up-scale information and the filter tap information may be provided in an appropriate header in packetized data transmission.

In a video codec, an adaptive Wiener filter aims to minimize the differences between two input pictures or picture regions, and the filter coefficients may be transmitted to the decoder site. For SVC enhancement layer coding, let Q(x,y) denote the value of an enhancement layer input pixel at position (x,y), and P(x,y) denotes the value of the processed lower layer reconstructed pre-filtering pixel at position (x,y). An adaptive Wiener filter with offset is performed on P(x,y) as equation (12) below to get the post-filter pixel value P'(x,y), where, $C_{m,n}$ denotes the adaptive filtering coefficients, and Offset denotes the offset value.

$$P'(x,y)=\Sigma_{m=-N_0}^{N_1} P(x+m,y+n)C_{m,n}+\text{Offset} \quad (12)$$

$M_0$, $M_1$, $N_0$, $N_1$ are parameters to control the number of Wiener filter taps. With different settings of $M_0$, $M_1$, $N_0$, $N_1$, the filter may be a symmetric filter or asymmetric filter, a 1-D filter or 2D filter, as examples.

The coefficients $C_{m,n}$ and offset value Offset may be adaptively generated at the encoder side and then may be coded into bitstreams for the enhancement layer decoding. One method to generate $C_{m,n}$ and Offset values is to minimize the sum of squared distortions between Q(x, y) and P'(x, y). A $C_{m,n}$ and/or the offset value may be forced to be zero, and then only the remaining filter parameters need to be derived by the encoder and then be sent to decoder. If the offset is forced to be zero, the filter equation (12) will be changed to equation (13). If Wiener filter is not used, the filter equation in (12) will be changed to equation (14).

$$P'(x,y)=\Sigma_{m=-M_0}^{N_1} P(x+m,y+n)C_{m,n} \quad (13)$$

$$P'(x,y)=P(x,y)+\text{Offset} \quad (14)$$

Figure 2:
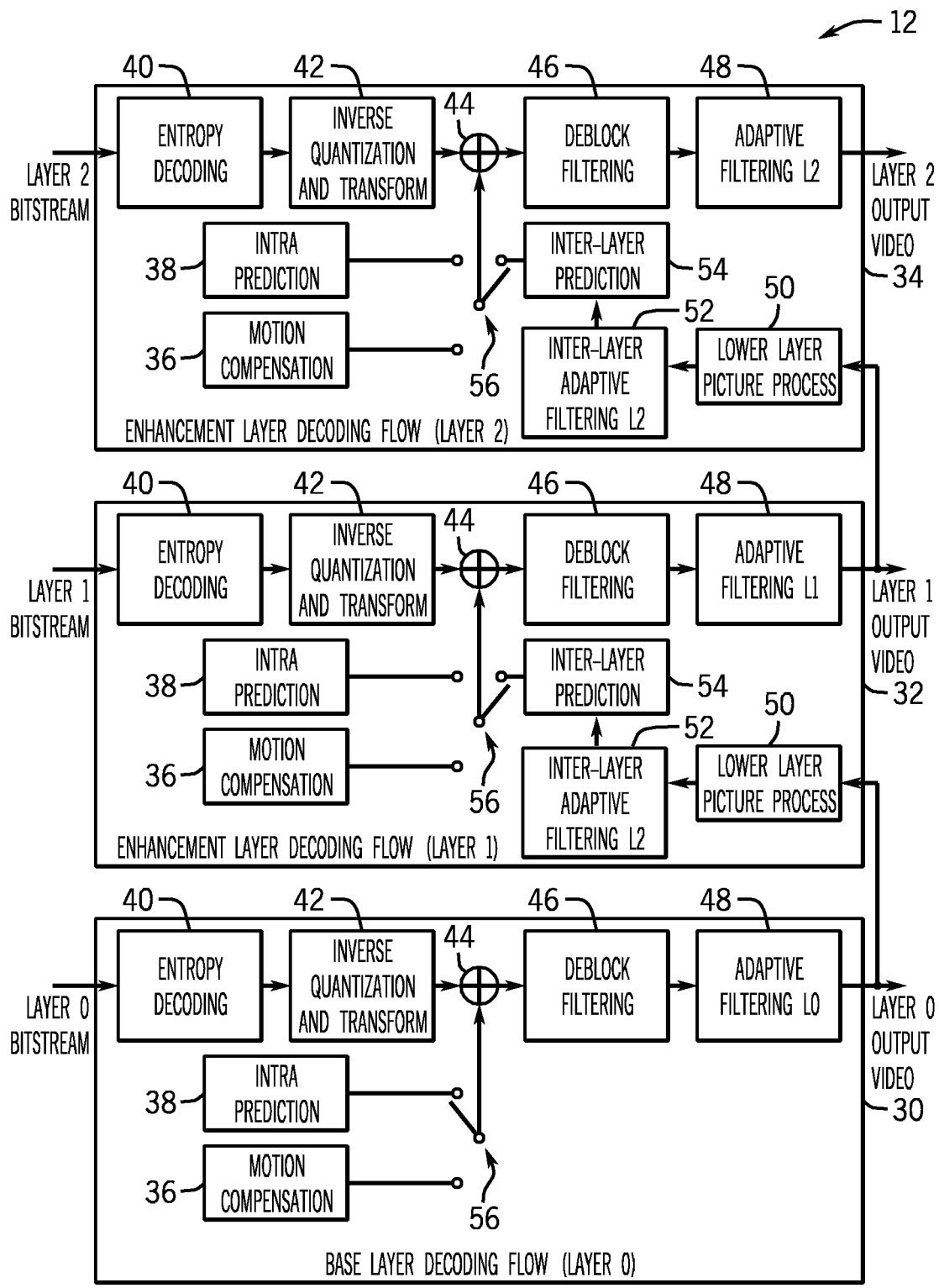
FIG. 2 is a depiction of a decoding flow for a three layer SVC bitstream according to one embodiment.

FIG. 2 shows an example decoding flow of a three-layer SVC bitstream, i.e., one base layer and two enhancement layers. The scalability may be spatial scalability, bit-depth scalability of some other scalability. The blocks 52, "Inter-layer Adaptive Filtering L1" and "Inter-layer Adaptive Filtering L2" are added into the SVC decoding flow to improve the inter-layer predictions. The inter-layer adaptive filters are applied on the processed lower layer picture to improve its quality. The three other adaptive filtering blocks, i.e., "Adaptive Filtering L0", "Adaptive Filtering L1" and "Adaptive Filtering L2" in the decoding flow are standard adaptive filtering blocks in one embodiment, as used in HEVC/H.265 coding standard, to improve the quality of the output video. The "Lower Layer Picture Process" may use frame-up scaling for spatial scalability, tone mapping for bit-depth scalability, or passing through without any processing.

In FIG. 2 the layer zero bitstream is provided to entropy decoding 40. The entropy decoded bitstream is provided to inverse quantization and transform 42. This is provided to a mixer 44 that receives an input via switch 56 from either an intra prediction unit 38 or motion compensation unit 36. In the case of the layer zero bitstream, the switch is connected to the intra prediction unit 38. After mixing the data from the intra prediction unit 38 and the inverse quantization and transform unit 42, the stream is deblock filtered at deblock filtering 46. Finally adaptive filtering L0 occurs at 48 to output a layer zero output video.

The layer zero output video is also provided to the next layer, layer one also labeled enhancement layer decoding flow 32. Particularly the layer zero output video is provided for lower layer picture process 50 in layer 32. Then the video is provided to the inter-layer adaptive filtering L1 block 52 and finally to the inter-layer prediction block 54. From here it is conveyed via the switch 56 to the mixer 44. The output from the layer 32, called layer one output video, is also provided to the lower layer picture process 50 in the layer 2 or enhancement layer decoding flow 34. Otherwise the sequence is the same as described in connection with the layer one. Ultimately, layer two video is output as indicated.

Figure 3:
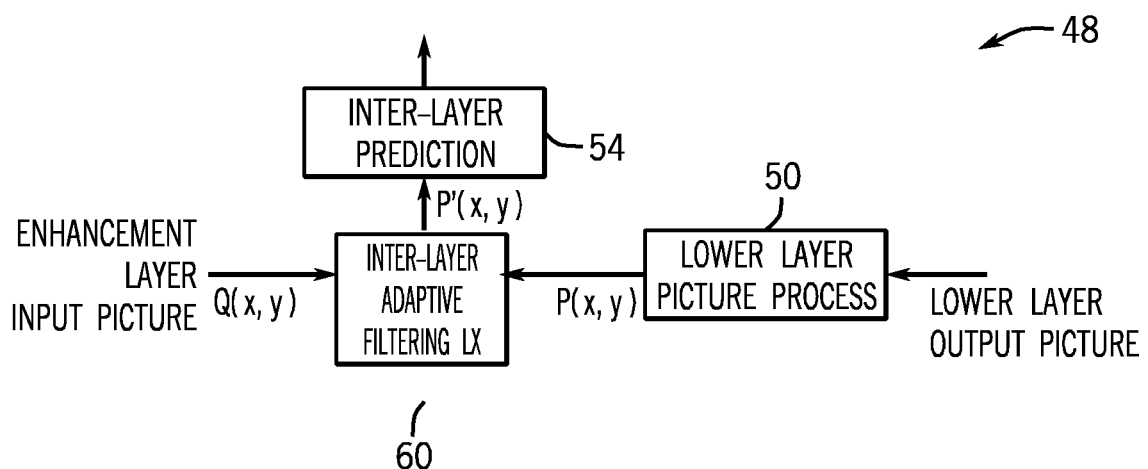
FIG. 3 shows inter-layer prediction with adaptive filtering at the encoder side in one embodiment.

FIG. 3 shows the inter-layer predictions with adaptive filtering for enhancement layer LX at encode size. The inter-layer adaptive filtering 60 aims to minimize the differences between the enhancement layer input picture Q(x, y) and the processed lower layer output picture P(x,y) 50 in one embodiment. The output filtered picture P'(x,y) is then used for inter-layer prediction 54.

In one embodiment, we can apply one filter on all pixels in the picture, and the encoder can decide turning on or turning off the filter and then send a flag to decoder to indicate the decision result. Considering that one filter may lack adaptation on some local areas of the picture, local adaptive filtering may be applied to achieve better coding efficiency.

In local adaptive filtering, the picture may be divided into multiple regions and then different filtering schemes may be applied to different regions. In one embodiment, only one filter is applied to the whole picture, and the encoder can decide for each region whether it should be filtered or not and then the encoder may send flags to the decoder to indicate the decision results. In another embodiment, multiple filters are applied to the whole picture, and the encoder can decide for each region whether it should be filtered or not and if it should be filtered, which filter (i.e. filter table index) should be used to filter this region and then send the decision results to decoder.

There are different criteria to partition a picture into multiple regions. In some embodiments, we can partition the picture into different regions according to pixel positions, e.g., uniformly dividing the whole picture into M×N regions. In some other embodiments, we can partition the picture into different regions by categorizing pixels into different classes according to pixel features, e.g., pixel values or pixel edge and gradient information, and one class of pixels is regarded as one region. In some other embodiments, we can partition the picture into different regions by dividing the picture into multiple small blocks and then categorizing the blocks into different classes according to the block features, e.g., average pixel value of the block or average edge and gradient information of the block, then one class of blocks is regarded as one region.

In some embodiments, the inter-layer adaptive filtering of an enhancement layer may re-use the region filter parameter, e.g., filter on/off flag and filter table index, of lower layers, and then those re-used information is not needed to be transmitted for this enhancement layer. In some other embodiments, the encoder can adaptively decide to re-use the lower layer adaptive filtering parameters or not, and, with re-use, to use the filter parameters of which lower layer, and then send the decision results to decoder.

SVC inter-layer prediction may be improved by applying the adaptive filter on processed lower layer reconstructed pictures. Here the lower layer reconstructed picture processing includes, for example, frame up-scaling for spatial scalability, tone mapping for bit-depth scalability, or passing through without any processing. Adaptive filtering aims to reduce the differences/distortion between the input pixels of an enhancement layer and the processed reconstructed pixels of its lower layer.

An adaptive Wiener filter with offset may act as the adaptive filter to improve the SVC inter-layer prediction of an enhancement layer coding. The Wiener filter coefficient and the offset value may be adaptively generated at the encoder side and then encoded and transmitted to decoder. In some embodiments, the offset value may be forced to zero, and only the Wiener filter coefficients need to be generated at the encoder side and then sent to decoder. In some embodiments, we only apply the offset value for filtering without applying the Wiener filter, then, only the offset value needs to be generated at encoder side and then be sent to decoder. In some embodiments, part of the Wiener filter coefficients may be forced to be zero to save the transmission bandwidth, and then only the remaining coefficients need to be generated at encoder side and then be sent to decoder.

The adaptive filter may be applied on the whole picture, i.e., all pixels in the picture use the same filter. The encoder may decide whether the whole picture should be filtered or not, and then transmit a flag to decoder to indicate the decision result. The picture may be partitioned into different regions, and then the adaptive filter may be applied on each region. Then encoder decides which regions should be filtered and then sends flags to decoder to indicate the decision results.

The picture may be partitioned into multiple regions and then different adaptive filters may be applied to different regions. The encoder can derive the filter parameters for each region and then encode and send the parameters to the decoder for decoding. Also, for each region, the encoder can decide whether it should be filtered or not, and then send flags to decoder to indicate the decision results.

Predictive coding of the enhancement layer filter coefficients may be used. The filter coefficient may be intra predicted, i.e., by predicting the value of one filter coefficient from the values of other coefficients of the same filter, or be inter predicted, i.e., by predicting the value of one filter coefficient from the coefficients of other filters. The other filters may be other filters of the same enhancement layer if multiple filters are applied for this enhancement layer picture, or the filters used for lower layers of the picture, or the filters used for other coded pictures.

Multiple predictive coding methods for filter coefficients may be used. The encoder may decide which predictive coding method should be used and then sends a flag to decoder to indicate the decision result.

The picture may be partitioned into different regions according to pixel positions, e.g., uniformly dividing the whole picture into M×N regions. The picture may be partitioned into different regions by categorizing pixels into different classes according to some other pixel features, e.g., pixel values or pixel edge and gradient information, and one class of pixels may be regarded as one region.

The picture may be partitioned into different regions by dividing the picture into multiple small blocks and then categorizing the blocks into different classes according to the block features, e.g., average pixel value of the block or average edge and gradient information of the block. Then one class of blocks is regarded as one region. If an adaptive filter is used for lower layer coding, the region filtering flags of the adaptive filters of lower layers for an enhancement layer adaptive filtering may be re-used. Then it is unnecessary to transmit independent region filtering flags for this enhancement layer, saving some transmission bandwidth in some embodiments. Here the lower layer adaptive filters may be the filters for improving the inter-layer prediction of lower enhancement layer, or the filters for improving the output video quality of lower layer. In some other embodiments, the encoder can adaptively decide to re-use the lower layer adaptive filtering parameters or not, and if re-use is chosen, to use the filter parameters of which lower layer, and then send the decision results to decoder.

Figure 4:
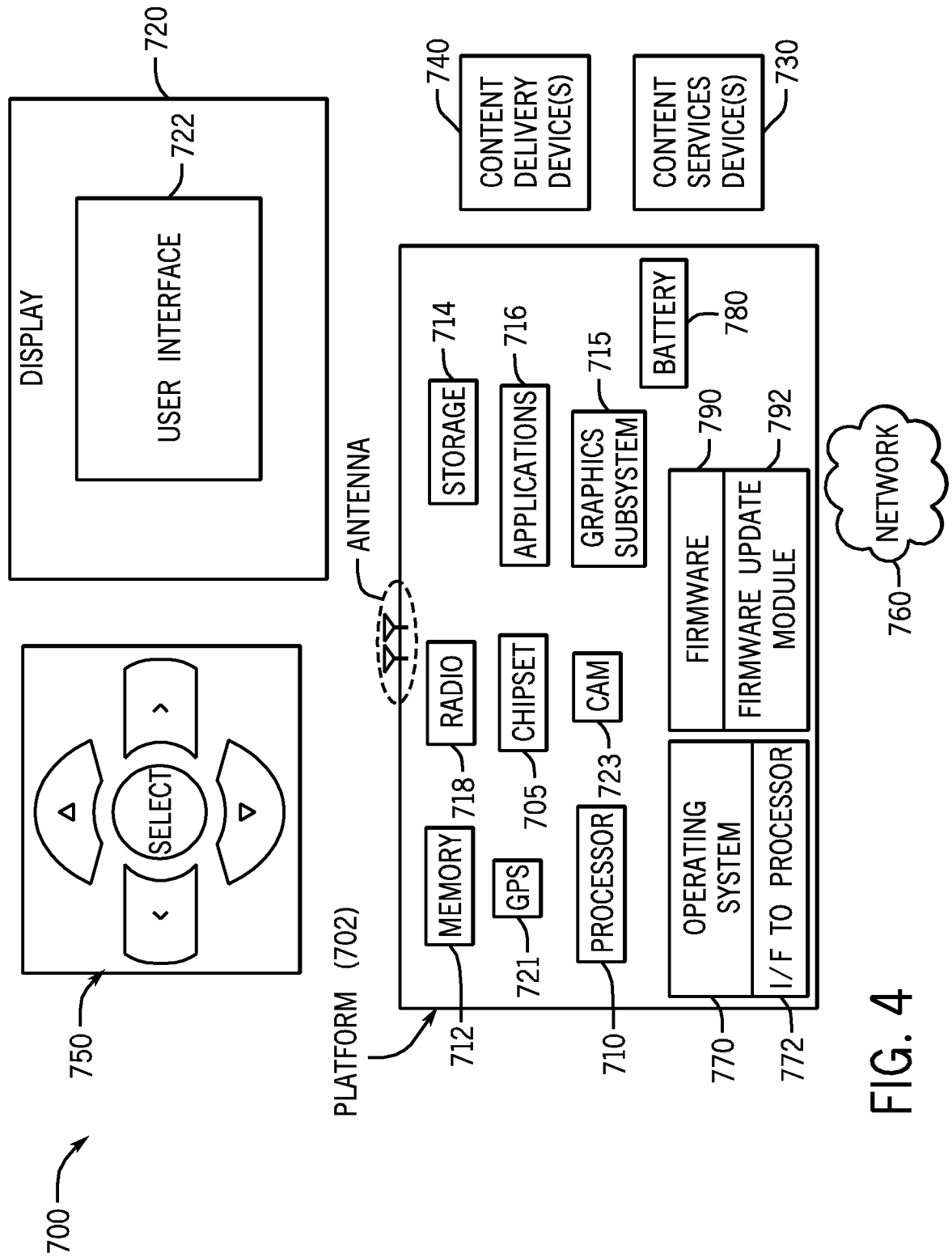
FIG. 4 is a system depiction for still another embodiment of the present invention.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 5:
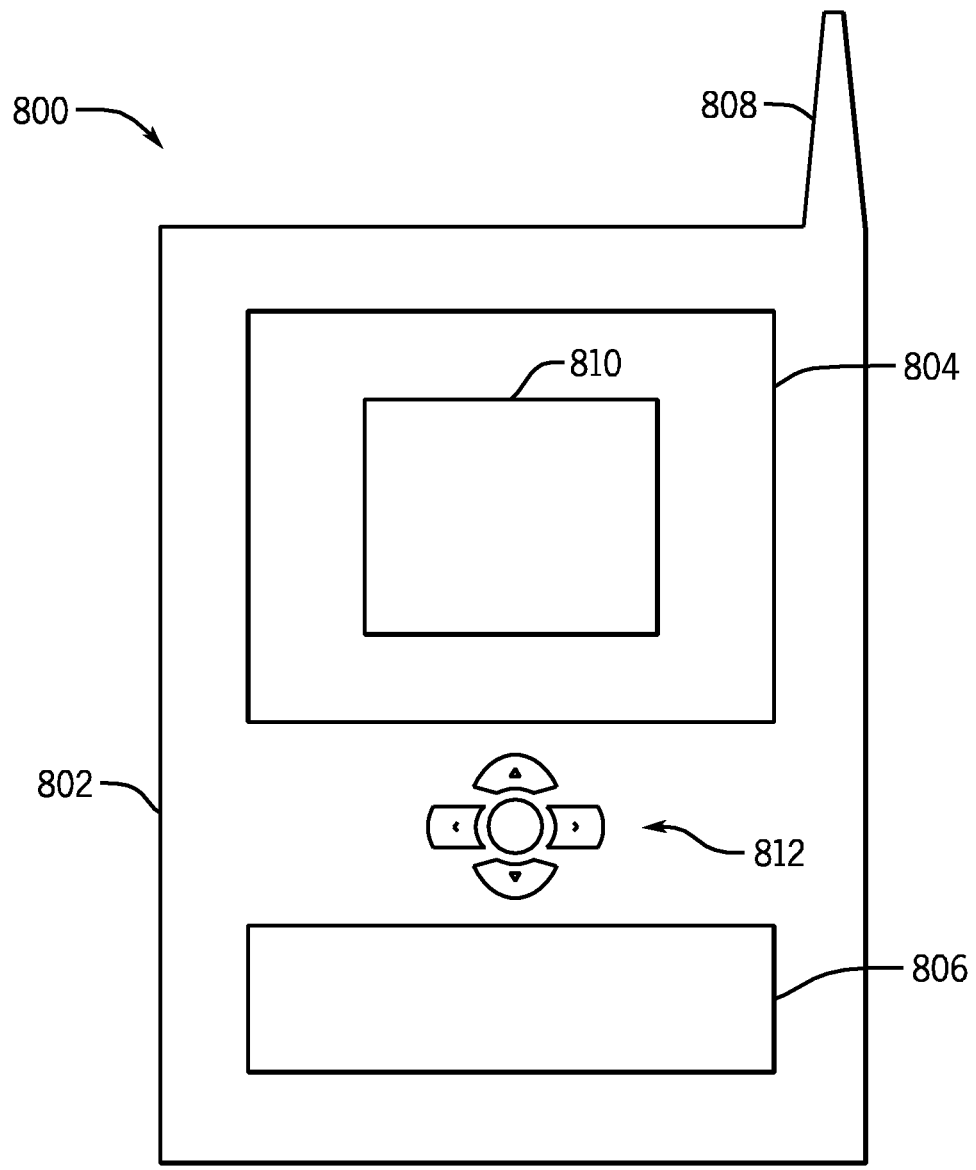
FIG. 5 is a front elevational view for another embodiment.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment, such as those shown in FIGS. 2 and 3 may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible, non-transitory machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising: using an adaptive Wiener filter with offset for video decoding. The method may include applying the adaptive Wiener filter with offset on processed lower layer reconstructed pictures to generate reference pictures for inter-layer predictions. The method may include only applying the adaptive Wiener filter on processed lower layer reconstructed pictures. The method may include only applying the offset on processed lower layer reconstructed pictures. The method may include receiving the filter coefficients and offsets from an encoder. The method may include using the same filter for all pixels in a picture. The method may include adaptively applying the adaptive Wiener filter with offset to each of a plurality of picture regions. The method may include deciding for each region whether to filter the region. The method may include applying predictive coding to enhancement layer filter coefficients. The method may include applying multiple predictive coding for filter coefficients. The method may include partitioning the picture into different regions according to pixel position. The method may include categorizing pixels into classes based on pixel features.

Another example embodiment may be a machine readable medium comprising a plurality of instructions and, in response to being executed on a computing device, causing the computing device to carry out the above-described method.

One example embodiment may be an apparatus comprising: an encoder; and a decoder, coupled to said encoder, with an adaptive Wiener filter with offset. The apparatus may include an operating system, a battery, firmware and a module to update said firmware. The apparatus may include said adaptive Wiener filter to generate reference pictures for interlayer predictions. The apparatus may only apply the adaptive Wiener filter on processed lower layer reconstructed pictures. The apparatus may include said encoder to pass filter coefficients and offsets to said decoder.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   using an adaptive Wiener filter with offset for video decoding;
   applying the adaptive Wiener filter on processed lower layer reconstructed pictures and input enhancement layer pictures to produce a filter output;
   using the filter output for interlayer prediction;
   determining whether to send Wiener filter coefficients and offsets from an encoder to a decoder, to send only Wiener filter coefficients from the encoder to the decoder or to send only offsets from the encoder to the decoder.

2. The method of claim 1 including applying the adaptive Wiener filter with offset on processed lower layer reconstructed pictures to generate reference pictures for inter-layer predictions.

3. The method of claim 1 including only applying the adaptive Wiener filter on processed lower layer reconstructed pictures.

4. The method of claim 1 including only applying the offset on processed lower layer reconstructed pictures.

5. The method of claim 1 including receiving the filter coefficients and offsets from an encoder.

6. The method of claim 1 including using the same filter for all pixels in a picture.

7. The method of claim 1 including adaptively applying the adaptive Wiener filter with offset to each of a plurality of picture regions.

8. The method of claim 7 including deciding for each region whether to filter the region.

9. The method of claim 7 including partitioning the picture into different regions according to pixel position.

10. The method of claim 9 including categorizing pixels into classes based on pixel features.

11. The method of claim 1 including applying predictive coding to enhancement layer filter coefficients.

12. The method of claim 1 including applying multiple predictive coding for filter coefficients.

13. At least one non-transitory machine readable medium storing a plurality of instructions and, in response to being executed on a computing device, causing the computing device to carry out a method comprising:
   using an adaptive Wiener filter with offset for video decoding;
   applying the adaptive Wiener filter on processed lower layer reconstructed pictures and input enhancement layer pictures to produce a filter output;
   using the filter output for interlayer prediction;
   determining whether to send Wiener filter coefficients and offsets from an encoder to a decoder, to send only Wiener filter coefficients from the encoder to the decoder or to send only offsets from the encoder to the decoder.

14. The medium of claim 13 including applying the adaptive Wiener filter with offset on processed lower layer reconstructed pictures to generate reference pictures for inter-layer predictions.

15. The medium of claim 13 including only applying the adaptive Wiener filter on processed lower layer reconstructed pictures.

16. The medium of claim 13 including only applying the offset on processed lower layer reconstructed pictures.

17. The medium of claim 13 including receiving the filter coefficients and offsets from an encoder.

18. The medium of claim 13 including using the same filter for all pixels in a picture.

19. The medium of claim 13 including adaptively applying the adaptive Wiener filter with offset to each of a plurality of picture regions.

20. The medium of claim 13 including deciding for each region whether to filter the region.

21. The medium of claim 13 including applying predictive coding to enhancement layer filter coefficients.

22. The medium of claim 13 including applying multiple predictive coding for filter coefficients.

23. The medium of claim 13 including partitioning the picture into different regions according to pixel position.

24. The medium of claim 13 including categorizing pixels into classes based on pixel features.

25. An apparatus comprising:
an encoder;
a decoder, coupled to said encoder, with an adaptive Wiener filter with offset, the decoder to apply the adaptive Wiener filter on processed lower layer reconstructed pictures and input enhancement layer pictures to produce a filter output, use the filter output for interlayer prediction, and determine whether to send Wiener filter coefficients and offsets from an encoder to a decoder, to send only Wiener filter coefficients from the encoder to the decoder or to send only offsets from the encoder to the decoder.

26. The apparatus of claim 25 including an operating system.

27. The apparatus of claim 25 including a battery.

28. The apparatus of claim 25 including firmware and a module to update said firmware.

29. The apparatus of claim 25 said adaptive Wiener filter to generate reference pictures for interlayer predictions.

30. The apparatus of claim 25 to only apply the adaptive Wiener filter on processed lower layer reconstructed pictures.

31. The apparatus of claim 25 said encoder to pass filter coefficients and offsets to said decoder.

* * * * *